J. A. BROOKS.
BRAKE MECHANISM FOR MAXIMUM TRACTION TRUCKS.
APPLICATION FILED OCT. 26, 1912.
1,138,842.
Patented May 11, 1915.
3 SHEETS—SHEET 3.
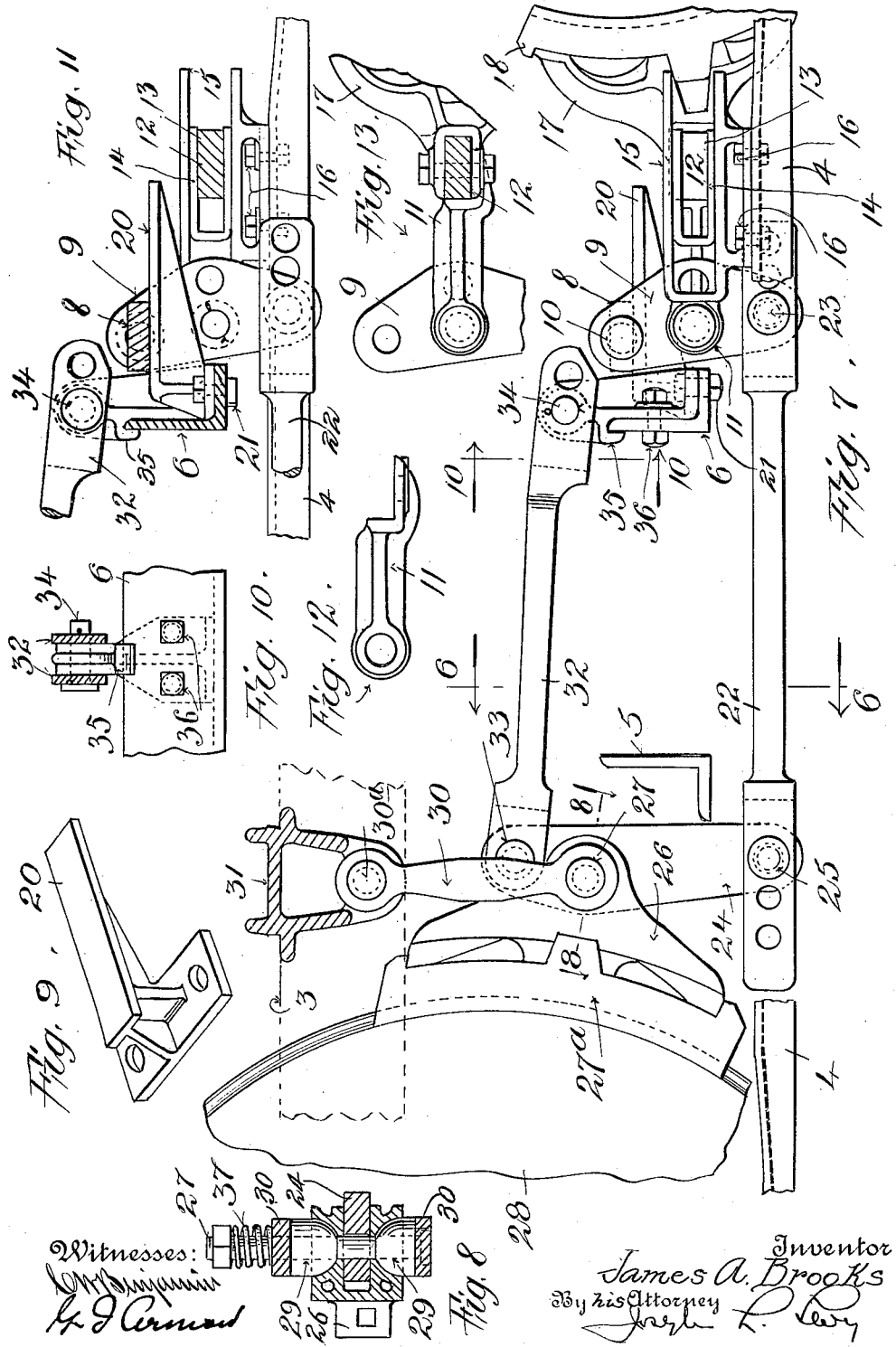

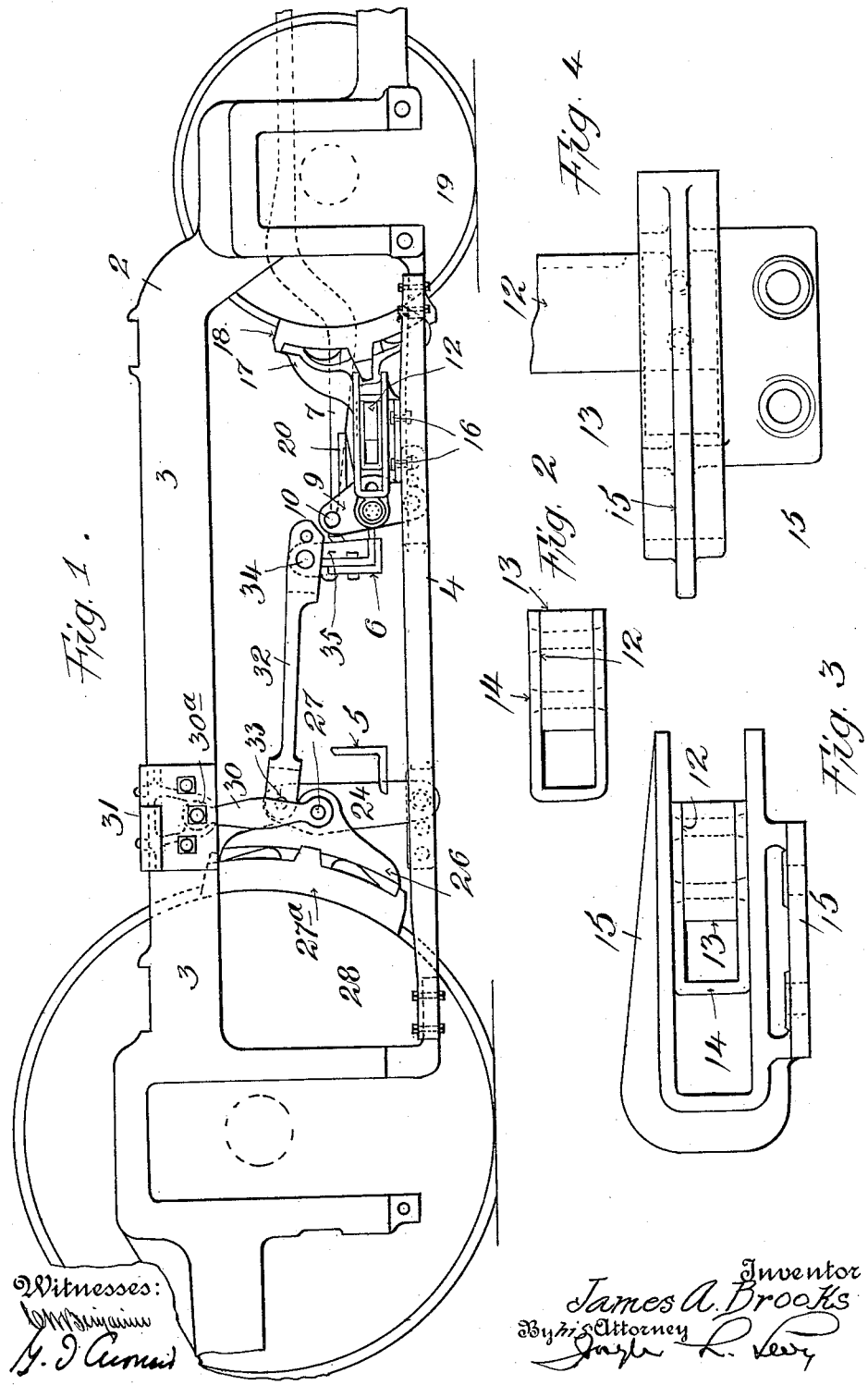

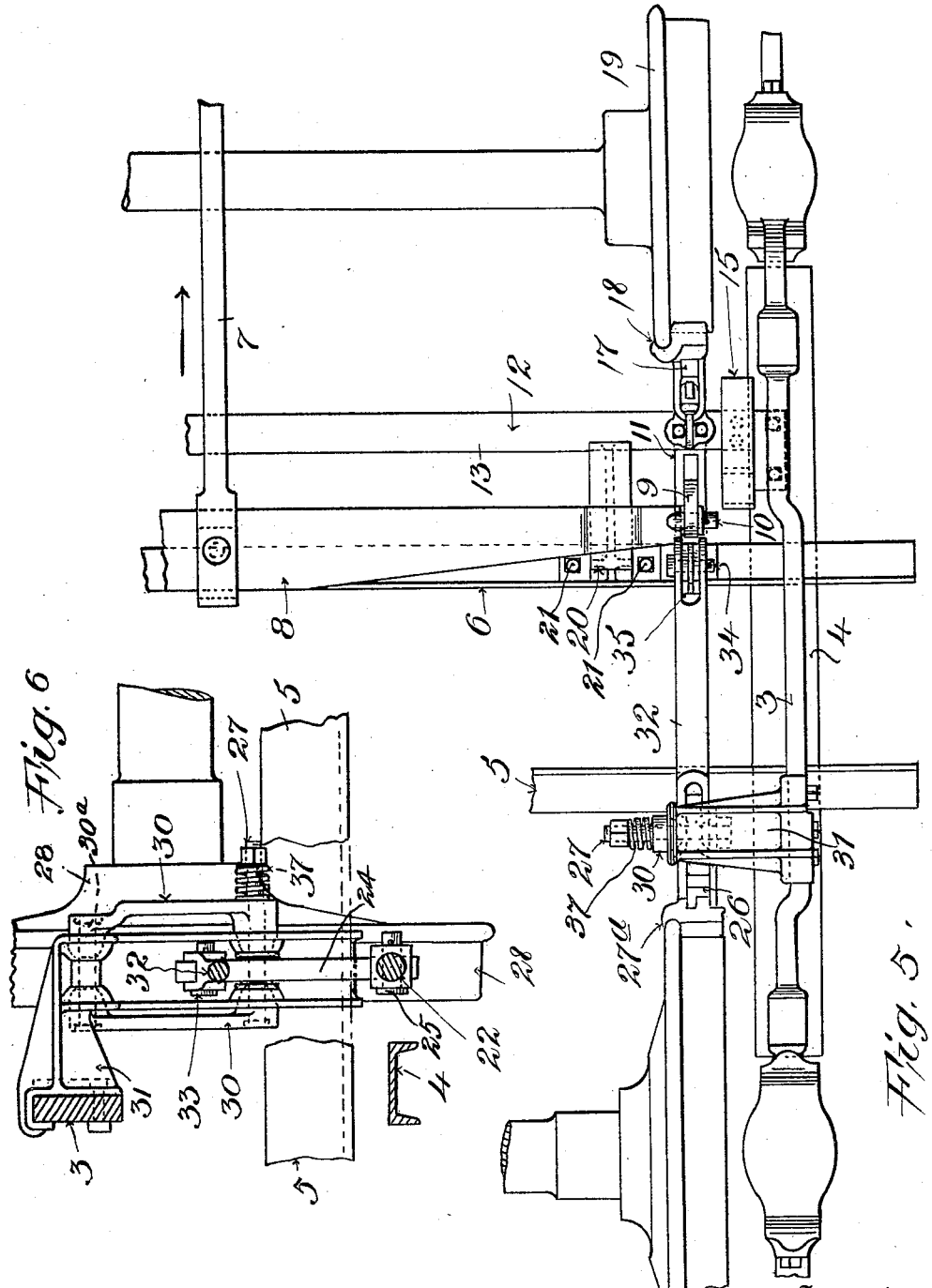

UNITED STATES PATENT OFFICE.

JAMES A. BROOKS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

BRAKE MECHANISM FOR MAXIMUM-TRACTION TRUCKS.

1,138,842. Specification of Letters Patent. Patented May 11, 1915.

Application filed October 26, 1912. Serial No. 727,824.

*To all whom it may concern:*

Be it known that I, JAMES A. BROOKS, a citizen of the United States, and a resident of the city and county of Philadelphia, State of Pennsylvania, have invented a new and useful Improvement in Brake Mechanisms for Maximum-Traction Trucks, of which the following is a specification.

The object of my invention is to provide a brake mechanism, which will be positive and certain in its operation, capable of adjustment and not liable to get out of order. This and other objects are accomplished by my invention, one embodiment of which is hereinafter set forth.

For a more particular description of my invention reference is to be had to the accompanying drawings, forming a part hereof, in which—

Figure 1 is a side elevation of a truck provided with my improved brake, only parts of the truck being shown. Fig. 2 is an end elevation of a brake beam. Fig. 3 shows the brake beam of Fig. 2 mounted in a guide for supporting the same. Fig. 4 is a plan view of the structure shown in Fig. 3. Fig. 5 is a plan view of a part of the structure shown in Fig. 1. Fig. 6 is a sectional view taken on the line 6—6 of Fig. 7, looking in the direction of the arrows. Fig. 7 is a side elevation, somewhat enlarged, of the brake mechanism. Fig. 8 is a sectional view taken on the line 8—8 of Fig. 7. Fig. 9 is a perspective view of a bracket for supporting the connecting bar. Fig. 10 is a sectional view taken on the line 10—10 of Fig. 7, looking in the direction of the arrows. Fig. 11 is a sectional view showing a connecting bar and brake beam and the mechanism for supporting and connecting the same. Fig. 12 shows a clevis adapted to connect a lever with a brake beam. Fig. 13 shows a brake beam in cross section and the parts connected therewith.

Throughout the various views of the drawings, similar reference characters designate similar parts.

My improved brake mechanism may be applied to any suitable truck 2, but prefer- ably to a maximum traction truck used to carry heavy loads where substantially two-thirds of the pressure of the brake shoes is applied to the large or driving wheels and one third to the smaller or trailing wheels. The truck has the usual top chord 3, bottom chord 4 and transoms 5 and 6, as well as other parts a few of which are shown.

The brake mechanism is provided with a body pull rod 7 (see Fig. 5) which is adapted to be drawn in the direction of the arrows. This rod 7 is united with a connecting bar 8, in the conventional manner, and this bar 8 connects vertical levers 9, the ends of this bar 8 being rounded at 10 for this purpose. The levers 9 are in each instance pivotally mounted in a clevis 11, which is fixed to a brake beam 12, by bolts or screws or any other suitable means. This brake beam 12 may be made in any suitable way, but preferably consists of a bar of steel, iron or other material 13 shod at each end with metal of a U-shape 14, held by rivets or other suitable means and this portion 14 enters a horizontally disposed slide or guide way 15, one slide being used at each end of the brake beam. The slide 15 is supported from the lower chord 4 by means of bolts 16 or other suitable means. At each end of the brake beam 12, and suitably secured thereto, is a brake shoe holder 17 carrying a brake shoe 18, which is adapted to rub against the wheel 19, when the brake is applied.

The bar 8 is supported by means of suitable brackets 20, one near each end, and each bracket is held in place by means of bolts 21, which secure it to the horizontal web of a transom 6.

The lower end of each lever 9 is provided with a connecting rod 22, which is divided at each end and provided with a number of perforations, so that at one end it is adjustably connected to the lever 9 by a pin 23 and at the other end to a vertical lever 24 through a pin 25. The pins 23 and 25 may be shifted from time to time so as to allow for a new brake shoe or for wear. The lever 24 is also pivotally connected to a brake shoe holder 26 by means of a suitable pin 27 and this brake shoe holder 26 carries a brake shoe 27ª which is adapted to bear against a driving wheel 28 of the conventional type. The brake shoe holder 26 is also provided with suitable sockets which engage the ball ends 29 of suitable hangers 30, which have corresponding ends entering suitable sockets in a bracket 31 fixed to a top chord 3. At their upper ends these hangers are secured by a bolt 30ª or other suitable means. The description above given, beginning with the connecting rod 22 applies to both sides of the truck, as this part of the mechanism is duplicated, so that only one brake beam is required and that is the brake beam 12 above referred to. The upper end of each lever 24 is pivotally connected to a suitable rod, 32 by means of a pin 33 and at its other end, this rod 32, is provided with a pin 34, which also engages a suitable bracket 35 fixed to the transom 6. The rod 32 is preferably bifurcated at each end just as is the rod 22 and at the end near the pin 34 it is provided with a plurality of perforations, so as to provide for adjustment to compensate for wear. The bracket 35 is held in place by means of suitable bolts 36, or in any other desired way.

If desired, the hangers 30 may have their ball ends kept in their respective sockets with some freedom of movement by having the bolts 27 and 30ª provided with suitable springs 37.

In view of the foregoing, the operation of my improved brake will be readily understood.

Assuming the parts to be as shown and power applied to the rod 7 in the direction of the arrows in Fig. 5, then the bar 8 is shifted to the right thereby throwing the upper ends of the levers 9 in the same direction about the pins in the clevis 11 as fulcrums, thereby forcing the brake shoes 18 against their respective wheels and at the same time the lower ends of the levers 9 are thrown to the left, thereby forcing the lower ends of the levers 24 to the left and causing the brake shoes 27ª to be applied to the wheels 28. When tension is withdrawn from the bar 7, the shoes withdraw from the wheels and cease to retard their progress.

While I have described one embodiment of my invention, it is obvious that it is not restricted thereto, but that it is broad enough to cover all structures which come within the scope of the annexed claims.

Having thus described my invention, what I claim is:—

1. In a device of the class described, a pair of brake shoes at each side of the truck, one of said brake shoes being slidably mounted and the other mounted so as to have a swinging movement, a brake beam uniting two of said shoes and means for applying greater pressure to the driving wheels than to the trailing wheels.

2. In a device of the class described, a pair of upright levers and a bar connecting the same, a brake beam and means for connecting the same to said levers, brake shoe holders secured to said beam, brake shoes on said holders, a second set of vertical levers, connecting rods connecting said two sets of levers, brake shoe holders connected to said second set of levers, means for supporting said brake shoe holders, brackets and means for supporting the same, and connecting rods, connecting the upper ends of said second set of vertical levers with said brackets.

3. In a device of the class described, a bar and slides for supporting the same, upright levers pivotally connected to said bar, a clevis pivotally connected to each of said upright levers, a brake beam uniting the clevises, a brake shoe holder carried by said brake beam, a brake shoe carried by said brake shoe holder, a guide for supporting said brake beam, means for supporting said guide, connecting rods pivotally connected to the lower ends of said upright levers, a second set of vertical levers and means for connecting one of said levers with each of said rods, a brake shoe holder pivotally connected to said second set of levers and a brake shoe carried by this holder, means for supporting said last mentioned brake shoe holder and means for pivoting the upper ends of said last mentioned levers, so that when power is applied to the bar connecting the first mentioned upright levers, the brake shoes are forced against their respective wheels.

4. In a device of the class described, a sliding brake shoe in coöperation with the trailing wheel, a swinging brake shoe for coöperation with the driving wheel, devices for holding and operating said brake shoes and means connecting said devices.

5. In a device of the class described, a sliding brake shoe in coöperation with the trailing wheel, a swinging brake shoe for coöperation with the driving wheel, devices for holding and operating said brake shoes and adjustable means connecting said devices.

6. In a device of the class described, driving wheels, trailing wheels, a sliding brake shoe supported from a lower element of the truck frame for coöperation with the trailing wheel, a swinging brake shoe pivotally hung from an upper element on the truck frame for coöperation with the driving wheels, and means connecting said shoes.

7. In a device of the class described, driving wheels, trailing wheels, a sliding brake shoe supported from a lower element of the truck frame for coöperation with the trailing wheel, a swinging brake shoe pivotally hung from an upper element on the truck frame for coöperation with the driving wheels, and adjustable means connecting said shoes.

8. In a device of the class described, a truck frame, a pair of brake shoes at each side thereof, one swingingly supported and the other slidably mounted, a brake beam uniting two of said shoes and means for causing the brake shoes at each side of the truck to be simultaneously applied to the wheels upon which these respective shoes bear.

9. In a device of the class described, a truck frame, a pair of brake shoes at each side of the truck, one pivotally hung from an upper member of the truck frame, and the other slidably supported from a lower member of the truck frame and means connecting each pair of shoes to cause them to be simultaneously applied to their respective wheels.

10. In a device of the class described, a truck frame, a pair of brake shoes at each side of the truck, one pivotally hung from an upper member of the truck frame, and the other slidably supported from a lower member of the truck frame, a single brake beam, a guide therefor and connections between said brake beam and the sliding shoes.

11. In a device of the class described, a truck frame, a pair of brake shoes at each side of the truck, one pivotally hung from an upper member of the truck frame, and the other slidably supported from a lower member of the truck frame, a single brake beam, a guide therefor and adjustable connections between the sliding and swinging brake shoes.

12. In a device of the class described, a truck frame, a pair of brake shoes at each side of the truck, one pivotally hung from an upper member of the truck frame, and the other slidably supported from a lower member of the truck frame, a single brake beam, a guide therefor and connections between said brake beam and the sliding shoes, the suspension means for the swinging brake shoes having ball and socket supports.

13. In a device of the class described, a truck frame, a pair of brake shoes at each side of the truck, one being swingingly supported and the other slidably mounted, a brake beam connecting the slidably mounted shoes, vertical levers connected with said brake beam and connections between said vertical levers and the swinging brake shoes.

14. In a device of the class described, a truck frame, a pair of brake shoes at each side of the truck, one being swingingly supported and the other slidably mounted, a brake beam connecting the slidably mounted shoes, vertical levers connected with said brake beam, connections between said vertical levers and the swinging brake shoes and means for adjustment of said connections.

15. In a device of the class described, a truck frame having a bottom chord at each side, a pair of guides, one guide being supported from each chord, levers connected to said guides, a transom supported by said truck frame, a pair of brackets carried by said transom and means connecting said levers and supported by said brackets.

16. In a device of the class described, a truck frame, a pair of oppositely disposed brackets, a brake beam slidably mounted in said brackets, a pair of clevises extending from the brake beam, an upright lever pivoted in each clevis, a transversely disposed bar connecting the upper ends of each of said levers, links at the lower ends of said levers and mechanism for limiting the movement of said links.

17. In a device of the class described, a truck frame, a crossing, longitudinally disposed brackets on the crossing, a bar slidably mounted on the brackets, levers engaging the ends of said bar, horizontally grooved brackets supported on the truck frame, a brake beam carrying brake shoes pivotally connected to said levers and movably engaging said grooved brackets, links attached to the lower ends of said levers, mechanism for limiting the movement of said links and means for operating the brake shoes.

18. In a device of the class described, a brake beam having a U shaped piece of metal secured thereto at each end, and brackets in which said U pieces slide.

19. In a device of the class described, a truck frame having top and bottom chords, a pair of brake shoes at one side of the truck, one of said shoes being supported from said top chord and the other from said bottom chord by mechanism connecting said shoes with their respective chords, and means for causing said shoes to be applied simultaneously to their respective wheels.

20. In a device of the class described, a truck frame having top and bottom chords, a pair of brake shoes at one side of the truck, one of said shoes being supported from said top chord and the other from said bottom chord by mechanism connecting said shoes with their respective chords, mechanism for causing said shoes to be applied simultaneously to their respective wheels, and a brake actuating means connected to one of said shoes.

21. In a device of the class described, a truck frame having top and bottom chords, a pair of brake shoes at one side of the truck, one of said shoes being supported from said top chord and the other from said bottom chord by mechanism connecting said shoes to their respective chords, means for applying one of said shoes to its respective wheel, a brake beam connected to another of said shoes, and means for actuating said brake beam whereby the shoe attached to said beam is applied to a wheel.

Signed at the city of Philadelphia, county of Philadelphia, and State of Pennsylvania, this 24th day of October, 1912.

JAMES A. BROOKS.

Witnesses:
HENRY C. ESLING,
H. F. McKILLIP.

Copies of this patent may be obtained for five cents each, by addressing the "Commissioner of Patents, Washington, D. C."